Patented June 17, 1947

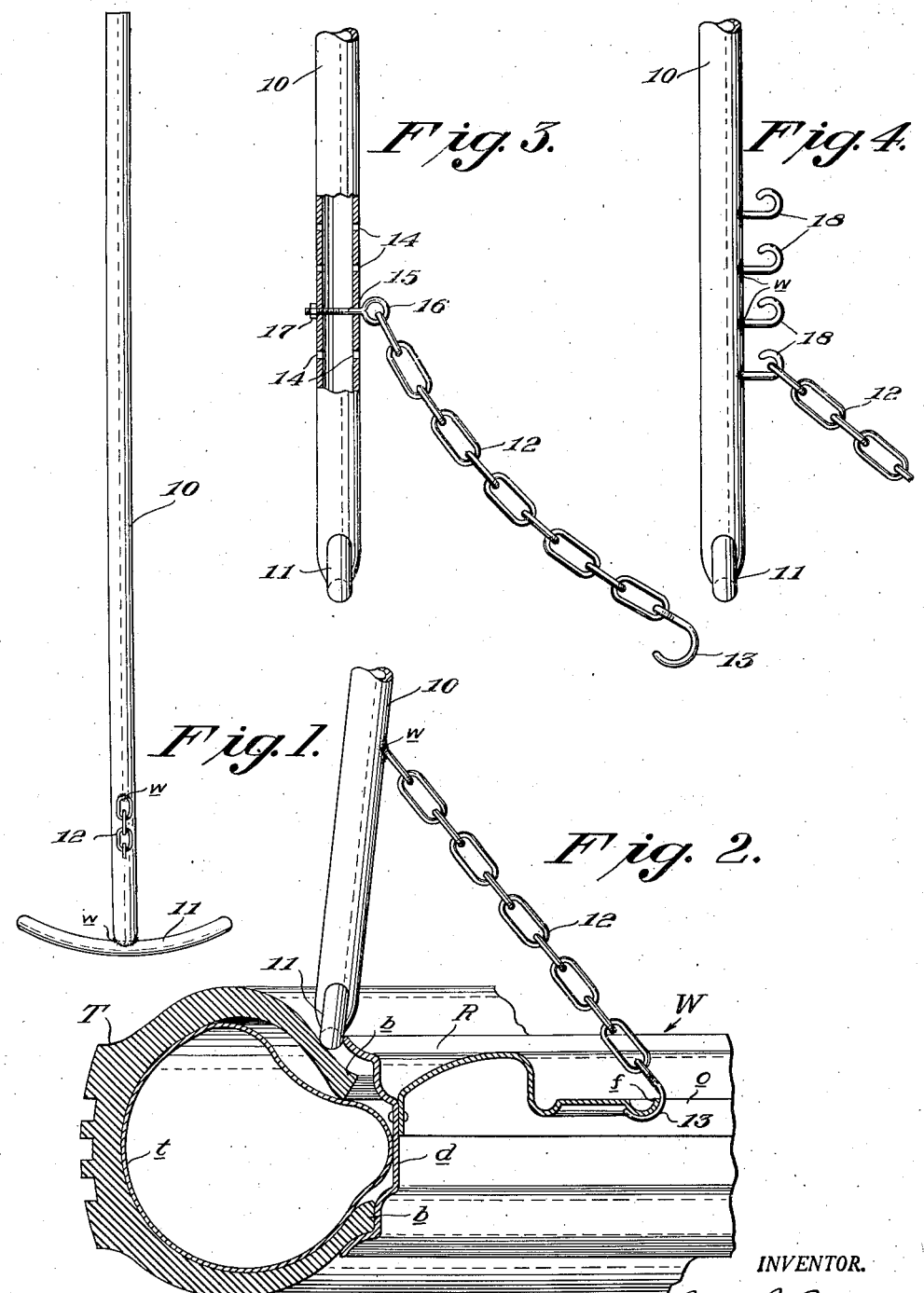

2,422,467

UNITED STATES PATENT OFFICE 2,422,467

TIRE LOOSENING TOOL

William Riley Carroll, Washington, D. C.

Application January 6, 1945, Serial No. 571,552

1 Claim. (Cl. 157—6)

This invention relates to a tire loosening tool.

In removing a tire from a wheel, particularly of the drop center rim type, it is necessary to deflate the tire and compress one edge or bead of the tire until it drops into the rim drop center, after which the other bead of the tire may be readily slipped over the corresponding rim flange.

As is generally known, the beads of tires, particularly when having been undisturbed for a relatively long time, adhere rather strongly to the rim and it has usually been the practice heretofore to hammer the tire loose from the rim with large mallets to break the adhesion between the tire and rim. This practice has, however, serious objections in that the sharp blows of the mallet or hammer present a danger in that they may injure the side walls of the tire, the rim, or even both.

With an appreciation of the above noted objections to the hammering of tires loose from their supporting rims, efforts have been made to overcome such practice in the provision of pressure tools, such, for example, as disclosed in the patent to Samuel Freed, No. 2,340,586, dated February 1, 1944. While the tool in accordance with this patent is obviously a marked advance in the operation of loosening tires, in that the tire is subjected to a constant pressure rather than intermittent blows as in the older practice, such tool, however, is not so constructed as to positively avoid damage to the tire wall.

In the patented structure the tire engaging member comprises opposed relatively sharp edges which would present a danger of cutting the tire, and while such member is obliquely disposed with respect to the side supporting legs, it will obviously not lie tangent to the engaged tire surface in all positions of the tire while being forced from engagement with a rim flange to a position within the rim drop center. Furthermore, it is highly advantageous that a tire bead be subjected to forces supplementing the direct pressure thereon as in the patent referred to.

A primary object of the present invention is the provision of a tire loosening tool which is capable of expeditiously loosening a tire bead from the supporting rim, while avoiding any possible damage to the tire or rim.

A further object of the invention is the provision of a tire-loosening tool which is simple in construction, durable, highly efficient in operation, and which is capable of being manufactured at relatively low cost.

Other features and advantages of the invention will become apparent from the specification and claims when considered in connection with the accompanying drawing, wherein:

Figure 1 is an elevational view of the improved tool in accordance with a preferred embodiment thereof and with the anchoring chain partly broken away for clarity of disclosure.

Fig. 2 is a diametric sectional view of the marginal portion of a wheel with a tire supported thereon and showing the improved tool in use in the loosening of the tire from the wheel rim, the tool being broken away at the hand-gripping portion thereof.

Fig. 3 is a broken elevational view partially in section showing a modification of the invention.

Fig. 4 is an elevational view similar to Fig. 3 but showing a still further modification of the invention.

Referring now in detail to the drawing, the improved tool is adapted for use with a wheel W supporting a tire T. The wheel W is substantially a disk provided with a central opening o surrounded by a beaded flange f. The rim R is of the drop center type as indicated at d whereby providing seats adjacent the rim flanges for receiving the tire beads b, the tire being of the pneumatic type and including an inner tube t.

The improved tool forming the subject-matter of the invention comprises an elongated rod or bar 10 which, as shown, is preferably tubular and may be expeditiously formed from pipe about one inch in diameter, and the bar may be approximately three feet in length.

A rocker 11, which preferably is in the form of an arcuate cylindrical rod, is rigidly secured at its center and on its concave side to the lower end of the bar 10 as by means of welding w. A length of chain 12 has one end thereof rigidly secured as by welding w to the bar 10 at a point approximately six inches above the rocker 11 and the free end of the chain is provided with a hook 13 adapted to engage the flange f, as indicated in Fig. 2.

In use, the tool is placed as in Fig. 2 with the central part of the rocker at the convex side thereof engaged with the tire T adjacent a bead b thereof and close to the rim flange with the chain hook 13 engaged with the flange f. An operator then grasps the bar 10 adjacent the upper handle end thereof and bears down on the bar while rocking same in a direction tangent to the rim flange, which combined movements readily disengage the bead b from the rim, as indicated in Fig. 2. Such disengagement is, of course, localized with each tool manipulation, and the tool is accordingly shifted at intervals circumferentially of the rim, as is readily permitted by sliding the hook 13 along the flange $f$ and successive sections of the tire are acted upon until one bead $b$ is free of the rim. The other bead $b$ if it still adheres to the rim is loosened in like manner, after which one bead is forced into the drop center $d$ and the other bead stripped from the rim in a manner well understood.

The tool above described and as illustrated in Figs. 1 and 2 is capable of cheap construction and the actual tire bead loosening portion thereof consists of a single rigid member and the provision of the chain 12 provides for bracing the bar 10 against movement away from the wheel center while at the same time permitting rocking of the bar together with the rocker 11 in a direction tangent to the rim.

The structure of Figs. 1 and 2 will be effective for standard disk form wheels, but in order to provide for variable sized wheels the modifications disclosed in Figs. 3 and 4 may be used. In accordance with the modification of Fig. 3, the bar 10 is provided with a plurality of axially spaced diametrical holes 14 selectively adapted to removably receive a bolt 15 having an eye 16 with which the chain 12 is engaged, the bolt being retained in any selected diametrically alined holes 14 by means of a nut 17. With this arrangement, the effective length of chain 12 may be adjusted for different sized wheels wherein the flange $f$ is at different distances from the rim or wherein the widths of the rims may differ.

In accordance with the modification of Fig. 4, the bar 10 is provided with a plurality of axially spaced hooks 18 which may be rigidly secured to the bar as by welding $w$. With this construction the end link of chain 12 may be selectively engaged with any one of the hooks.

It will be appreciated from the foregoing disclosure that the improved tool is well adapted for use in loosening tires from their supporting rims without any danger of injury to the tires or rims.

At this point, it is to be particularly noted that the rocker 11 provides a perfectly smooth tire engaging surface and that regardless of the weight imposed on the bar 10 or the extent of rocking movement thereof, the tire will not be injured or even marred.

While I have disclosed but certain specific embodiments of the invention, such are to be considered as illustrative only, and not restrictive, the scope of the invention being defined in the subjoined claim.

What I claim and desire to secure by U. S. Letters-Patent is:

A tire bead loosening tool comprising a tire-engaging rocker in the form of a relatively long arcuate cylindrical rod providing a smooth convex tire-engaging surface throughout the length thereof, a relatively long cylindrical bar having one end thereof rigidly secured to the concave side of the rod with its axis disposed at right angles to a plane tangent to the convex side of the bar centrally of the length thereof, and a flexible guy member having a wheel-engaging hook at one end thereof and having its opposite end connected to the bar substantially remote from the rocker and at a point in that axial plane of the bar which bisects the rocker transversely whereby the flexible member provides a balanced support for the bar and rocker.

WILLIAM RILEY CARROLL.

REFERENCES CITED

The following references are of record in the file of this patent:

UNITED STATES PATENTS

| Number | Name | Date |
|---|---|---|
| 1,567,276 | Kowalzcyk et al. | Dec. 29, 1925 |
| 1,122,599 | Johnson | Dec. 29, 1914 |
| 2,305,886 | Mahler | Dec. 22, 1942 |

OTHER REFERENCES

"Popular Mechanics," page 684, May 1941.